(12) United States Patent
Hansen et al.

(10) Patent No.: US 8,926,936 B2
(45) Date of Patent: Jan. 6, 2015

(54) PROCESS FOR PRODUCTION OF SULPHURIC ACID

(75) Inventors: Anders Helbo Hansen, Frederiksberg (DK); Anders Juul Rasmussen, Glostrup (DK); Mads Lykke, Brønshøj (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 14/110,099

(22) PCT Filed: Mar. 16, 2012

(86) PCT No.: PCT/EP2012/001183
§ 371 (c)(1),
(2), (4) Date: Oct. 4, 2013

(87) PCT Pub. No.: WO2012/136307
PCT Pub. Date: Oct. 11, 2012

(65) Prior Publication Data
US 2014/0048228 A1    Feb. 20, 2014

(30) Foreign Application Priority Data

Apr. 6, 2011 (DK) ................. 2011 00260

(51) Int. Cl.
| | |
|---|---|
| *F25B 1/00* | (2006.01) |
| *F25B 29/00* | (2006.01) |
| *C01B 17/69* | (2006.01) |
| *F25J 1/00* | (2006.01) |
| *B01D 5/00* | (2006.01) |
| *B01D 19/00* | (2006.01) |
| *C01B 17/765* | (2006.01) |
| *C01B 17/80* | (2006.01) |
| *C01B 17/74* | (2006.01) |
| *C01B 17/90* | (2006.01) |
| *F16L 53/00* | (2006.01) |
| *F16L 55/027* | (2006.01) |

(52) U.S. Cl.
CPC ............ *F25J 1/0002* (2013.01); *B01D 5/0039* (2013.01); *B01D 19/0036* (2013.01); *C01B 17/765* (2013.01); *C01B 17/806* (2013.01); *C01B 17/74* (2013.01); *C01B 17/90* (2013.01); *F16L 53/001* (2013.01); *F16L 55/027* (2013.01)
USPC .............................. 423/522; 165/58; 165/110

(58) Field of Classification Search
USPC ........ 165/58, 110; 423/522; 137/171; 138/40
See application file for complete search history.

(56) References Cited

U.S. PATENT DOCUMENTS 3,780,166 A    12/1973  Drechsel et al.
4,697,613 A *  10/1987  Wienck .................... 137/171
(Continued)

FOREIGN PATENT DOCUMENTS

EP    1 616 610 A1    1/2006
GB    1 088 426 A    10/1967
(Continued)

*Primary Examiner* — Timothy Vanoy
(74) *Attorney, Agent, or Firm* — Dickstein Shapiro LLP (57) ABSTRACT

The invention relates to a condenser, having a process gas side and a heat transfer medium side said condenser being configured for feeding a hot process gas containing a condensable component to an inlet of the condensing side, and being further configured for withdrawing a cooled process gas from an outlet of the condensing side, and being even further configured for withdrawing a condensate in a position proximate to one end of the condenser, and said condenser having the process gas side divided in a process gas cooling zone configured for having a cool heat transfer medium inlet and a heated heat transfer medium outlet, and a process gas re-heating zone downstream the process gas cooling section, configured for re-heating of the process gas, as well as a processes for condensation and production of sulphuric acid employing such a condenser.

13 Claims, 5 Drawing Sheets

(56) References Cited

U.S. PATENT DOCUMENTS 5,122,352 A * 6/1992 Johnson .................. 423/243.12
5,509,272 A    4/1996 Hyde
2010/0068127 A1 3/2010 Schoubye

FOREIGN PATENT DOCUMENTS

GB    1 308 700 A    2/1973
GB    1 470 334 A    4/1977

* cited by examiner

PROCESS FOR PRODUCTION OF SULPHURIC ACID

The present invention relates to a condenser designed for avoiding downstream condensation problems, and a process employing such a condenser for the production of concentrated sulphuric acid and oleum from feed gases with 0.1-30% $SO_2$ and $SO_3$ ($SO_x$) employing a sulphuric acid condenser. The feed gas may originate from combustion of sulphur and sulphur compounds, from wet scrubbing of $SO_2$ gases originating from roasting of metal sulphides, from thermal regeneration of spent sulphuric acid and sulphates or from gas produced from combustion of flue gases rich in $H_2S$. Up to 99.995% of the $SO_x$ in the feed gas can be recovered as typically 95-99.5 wt % concentrated sulphuric acid and/or oleum with up to 25 wt % $SO_3$. The process of the disclosure is concerned with avoiding corrosion by hot sulphuric acid droplets in the process equipment by ensuring conditions outside the condenser which do not favour condensation of sulphuric acid droplets.

It is known to produce concentrated sulphuric acid from strong $SO_2$-gases containing up to 30 vol % $SO_2$ with $SO_2$-conversions of up to 99.9% or more by two-step catalytic $SO_2$-conversion with intermediate absorption of $SO_3$ or condensation of $H_2SO_4$ in a process involving both an intermediate and a final absorption or condensation step. In principle, $SO_3$ in the gas phase is transferred to the liquid phase by absorption of the $SO_3$ in the liquid phase, while $H_2SO_4$ vapour is transferred to liquid phase by condensation in which the gas is cooled to below its sulphuric acid dew point either by direct contact with circulating acid used as the coolant, or in falling film condensers in which the gas is cooled to below its dew point and the acid is condensed on surfaces of air cooled glass tubes.

Our U.S. Pat. No 7,361,326 discloses a double condensation process for production of concentrated sulphuric acid from feed gases with up to 30% $SO_2$ and $H_2O/SO_2$ ratio above about 1. In the first step of the process, most of the $SO_2$ is converted to $SO_3$ and subsequently the process gas is passed to an intermediate condenser in which $SO_3$ and $H_2SO_4$ vapour is condensed as concentrated sulphuric acid either in a packed tower cooled by circulating acid or in vertical, air cooled glass tubes with either up-flow or down-flow of the process gas in the tubes. The latter is mentioned as an option to avoid flooding at high gas velocities but is said to convey the disadvantage that it produces sulphuric acid of low concentration (70-85 wt %), thus requiring a subsequent concentration stage, such as a packed tower to reach the desired sulphuric acid concentration of 95 wt % or above. The process gas exiting from the intermediate condenser passes through a second $SO_2$ conversion step and subsequently to a final wet condensing stage under the addition of particles.

In the prior art the process gas flow out of the condenser glass tubes, is a gas at or close to condensing conditions, by the very nature of the condenser. Condensed concentrated $H_2SO_4$ is highly corrosive. Therefore for this section of the process layout, expensive equipment with lined surfaces, or made from glass has been necessary, at least until condensing conditions are overcome, e.g. by dilution by air or heating of the process stream.

Similarly the output from condensers in other configurations may be related to undesired condensation immediately downstream the condenser, with negative chemical or corrosion effects.

It is therefore an object of the present disclosure to overcome the drawback related to the prior art in which intermediate equipment must be designed to overcome negative consequences of condensation such as a need to withstand condensing sulphuric acid conditions.

This object is met by providing a condenser comprising a section in which the process gas containing a condensable component is re-heated to a temperature above condensing conditions, such that the process gas flowing from the condenser to the downstream equipment is non-condensing, and in the case of corroding condensable liquids, the equipment can be made by standard carbon steel.

For the purpose of the present application the following terminology shall be adapted:

The dew point for a component of a gas is the temperature/pressure at which the component condenses from the gas mixture.

A gas at conditions X, containing one or more components condensable at conditions Y, shall be understood as a composition which at conditions X (temperature and pressure) is gaseous, but for which at conditions Y (lower temperature and/or higher pressure), a fraction will condense as a liquid. Where conditions are not mentioned; i.e. a gas containing one or more condensable components, conditions Y are assumed to be atmospheric pressure and room temperature, and conditions X are assumed to be at a higher temperature and/or a lower pressure, such that the gas is "above the dew point" i.e. non-condensing. The term a condensable gas shall be understood as a gas containing one or more condensable components at room temperature and atmospheric pressure.

A condenser shall be understood as a process unit in which heat exchange occurs between a warm process gas and a heat transfer medium, such that if the warm process gas contains a condensable component, this component condenses inside the condenser.

The condensing side or process gas side of the condenser shall be understood as the side of the condenser configured for a flow of the process gas containing condensable components flows, irrespectively of whether the conditions are such that condensation actually takes place.

The heat transfer media side of the condenser shall be understood as the side of the condenser in which the heat transfer medium flows.

Condensate shall be understood as a liquid formed by cooling of a gas containing a condensable component. Upstream relative to a position, shall be understood as being in a position closer to the inlet during typical operation.

Downstream relative to a position, shall be understood as being in a position closer to the outlet during typical operation.

For the condenser unit, the upstream section and the downstream section shall be defined by the typical flow direction of the process gas side, not the heat transfer medium. An upstream process gas cooling zone shall be understood as a zone of the process gas side of the condenser, which is proximate to the inlet of the process gas to the condenser. A downstream process gas cooling zone shall be understood as a zone of the process gas side of the condenser, which is proximate to the outlet of the process gas from the condenser.

A process gas re-heating zone shall be understood as a zone of the process gas side of the condenser, in which the process gas is reheated.

Counter-current flow shall be understood as two streams in which the flows are in opposite or substantially opposite directions.

Cross flow shall be understood as two streams in which the flows are in orthogonal or substantially orthogonal directions.

Throughout the application chemical compounds may be referred to by chemical formulae, chemical names or trivial names. These shall be understood as fully synonomous, and no special meaning shall be conferred from differences in this terminology.

The object of avoiding condensation problems is met according to the present invention by a condenser having a process gas side and a heat transfer medium side said condenser being configured for feeding a hot process gas containing a condensable component to an inlet of the condensing side, and being further configured for withdrawing a cooled process gas from an outlet of the condensing side, and being even further configured for withdrawing a condensate in a position proximate to one end of the condenser, and said condenser having the process gas side divided in a process gas cooling zone configured for having a cool heat transfer medium inlet and a heated heat transfer medium outlet, and a process gas re-heating zone downstream the process gas cooling section, configured for re-heating of the process gas, with the associated benefit of the process gas leaving the condenser being substantially non-condensing.

In a further embodiment configured for the process gas side of the process gas re-heating zone to receive thermal energy from the heated heat transfer medium, with the associated benefit of increased heat efficiency, by recuperation of the heat released in the condenser.

A further embodiment is configured for the heat transfer medium and the process gas in the reheating zone to flow counter-current, with the associated benefit of improved heat transfer from heat transfer medium to process gas.

In a further embodiment the condenser is configured for the heat transfer medium and the process gas in the reheating zone to operate in cross-flow, with the associated benefit of a simple physical construction of the reheating zone.

In a further embodiment the condenser is configured for the condensate being withdrawn proximate to the process gas inlet, with the associated benefit of improved condensation efficiency, thus avoiding subsequent concentration of the condensate.

In a further embodiment the condensate comprises sulphuric acid or oleum, providing the benefits above specifically to the process of sulphuric acid or oleum production.

In a further embodiment the condenser is configured for the process gas side to be separated from the heat exchange medium by glass, with the associated benefit of a high extent of corrosion resistance in the condenser.

In a further embodiment the condenser comprises glass tubes configured for having a flow of process gas on the inside of the glass tubes and a flow of heat transfer medium on the outer side of the glass tubes, with the associated benefit of a high surface area of the thermal interface between the process gas side and the heat transfer medium side.

In a further embodiment the condenser comprises glass tubes configured for having a flow of heat transfer medium on the inside of the glass tubes and a flow of process gas on the outer side of the glass tubes, with the associated benefit of the physically orientation of the glass tubes being independent of the withdrawal of condensate, e.g. allowing mounting the glass tubes horizontally.

In a further embodiment the condenser further comprises a flow restricting element separating the flow of heat transfer medium on the heat transfer medium side of the condensing zone and the re-heating zone, with the associated benefit of thermal separation of the condensing zone and the reheating zone.

In a further embodiment the flow restricting element comprises one or more stabilising elements attached to a metal plate, with the associated benefit of obtaining a high pressure stability of the flow restricting element, while only requiring a limited amount of materials, compared to a massive plate with the same pressure stability.

In a further embodiment the condenser further comprises one or more turbulence enhancing elements, with the associated benefit of providing improved contact of the process gas with the tube walls.

In a further embodiment the condenser further comprises one or more securing elements, such as individual indents, with the associated benefit of providing means for securing the position elements inside the tubes with minimal modification of the tubes.

In a further embodiment the condenser further comprises securing shoulder being a section of the glass tube having a smaller inner cross sectional area, with the associated benefit of providing means for securing the position elements inside the tubes without jeopardising the overall outer shape of the tube.

In a further embodiment the one or more turbulence enhancing elements are configured for being secured by hanging from the securing elements, with the associated benefit of avoiding deformation of a droplet coalescing element by the weight of the turbulence enhancing element.

In a further embodiment the one or more turbulence enhancing elements are configured for being secured by resting on the securing elements, with the associated benefit of avoiding tensile stress in the turbulence enhancing element.

In a further embodiment the condenser further comprises a droplet coalescing element, with the associated benefit of mist and droplets being coalesced such that the condensation can be maximized before reheating the process gas.

In a further embodiment the securing element engages the droplet coalescing element such that the movement of the droplet coalescing element is restricted, with the associated benefit of the droplet coalescing elements being secured in a position where the condensation can be maximized before reheating the process gas.

In a further embodiment the condenser further comprises a restriction element configured for restricting the movement of the droplet coalescing element, with the associated benefit of further securing the position of the droplet coalescing element.

In a further embodiment of the condenser having a tube shoulder as securing element the restriction elements further comprises one or more sheet shaped elements having a narrow and a wide end, and configured for in use to have its wide end mechanically engaged with the securing shoulder of the tube wall, such that the movement of the restriction element is restricted, with the associated benefit of securing the position of the droplet coalescing element, with minimal additional pressure loss over the combined droplet coalescing element and securing element.

In a further embodiment of the condenser having one or more tube indentations as securing elements, the restriction elements further comprises a ring shaped element, configured for in use to have its perimeter mechanically engaged with the securing elements, such that the movement of the restriction element is restricted, with the associated benefit of stable contact against the full tube wall perimeter.

An alternative implementation of the invention is a process for the condensation of sulphuric acid and/or oleum in a process gas comprising the steps of:

(i) passing the process gas to a sulphuric acid condensing stage according to the present disclosure in which the inlet temperature is above the dew point of sulphuric acid (ii) cooling the process gas to below the dew point of sulphuric acid,
(iii) condensing and withdrawing sulphuric acid, and
(iv) reheating the process gas to above the sulphuric acid dew point within the condenser stage which is associated with the benefit over the prior art that the requirements for corrosion resistant material downstream the condenser is reduced, as the risk of downstream condensation is removed.

In a further embodiment the temperature of the process gas at the outlet from the condenser stage after reheating in step (iv) is at least 10° C. above the sulphuric acid dew point with the associated benefit of the requirements for corrosion resistant material downstream the condenser is reduced, as the risk of downstream condensation is removed, with sufficient safety margin.

A further alternative implementation of the invention involves a process for the production of sulphuric acid and/or oleum in a process gas comprising the steps of:
(a) providing a feed process gas containing 0.1-30 mol % of $SO_2$
(b) passing the feed process gas through a first $SO_2$-conversion step in which $SO_2$ is oxidized to $SO_3$ in one or more catalyst beds;
(c) cooling the $SO_3$-containing process gas from said first $SO_2$-conversion step to a temperature 0-100° C. above the sulphuric acid dew point of the process gas; and
(d) condensing sulphuric acid in the process gas in a first condensation stage,
in which the condenser stage is operated according to the present disclosure, with associated benefit of providing the benefits of the present disclosure to the production of sulphuric acid.

In a further embodiment of the present invention the process for the production of sulphuric acid and/or oleum in a process gas further comprises the steps
(e) further reheating the resulting process gas stream from step (f) and passing this process gas to a second $SO_2$-conversion step in which remaining $SO_2$ is oxidized to $SO_3$ in one or more catalyst beds,
(g) cooling the process gas to a temperature 0-100° C. above its sulphuric acid dew point and
(h) subsequently passing the process gas to a final condensing stage
in which at least one of the condenser stages (d) and (h) are operated according to the present disclosure, with the associated benefit of providing increased levels of sulphur dioxide removal.

A further embodiment involves the inlet temperature of process gas to the second catalytic unit to be in the range 350-470° C., preferably, 350-400° C., or preferably 350-370° C., with the associated benefit of matching the requirements for the catalyst bed, while ensuring optimal heat balance, and minimal excess temperature which will ensure that the $SO_2$/$SO_3$ balance is optimised.

A further embodiment involves the inlet temperature of process gas to the second catalytic unit to be in the range 400-470° C., preferably 400-450° C. with the associated benefit of providing a high reaction rate, thus allowing a small catalyst bed.

A further embodiment involves adding the oxidant in the form of $O_2$ rich gas, such as pure $O_2$ with the benefit of adding less inert gas compared to atmospheric air, which again will result in reduced size of the process equipment, and thus reduced cost.

These and other characteristics of the disclosure will be clear from the following description of a preferential form of embodiment, given as a non-restrictive example, with reference to the attached drawings wherein.

Figure 1:
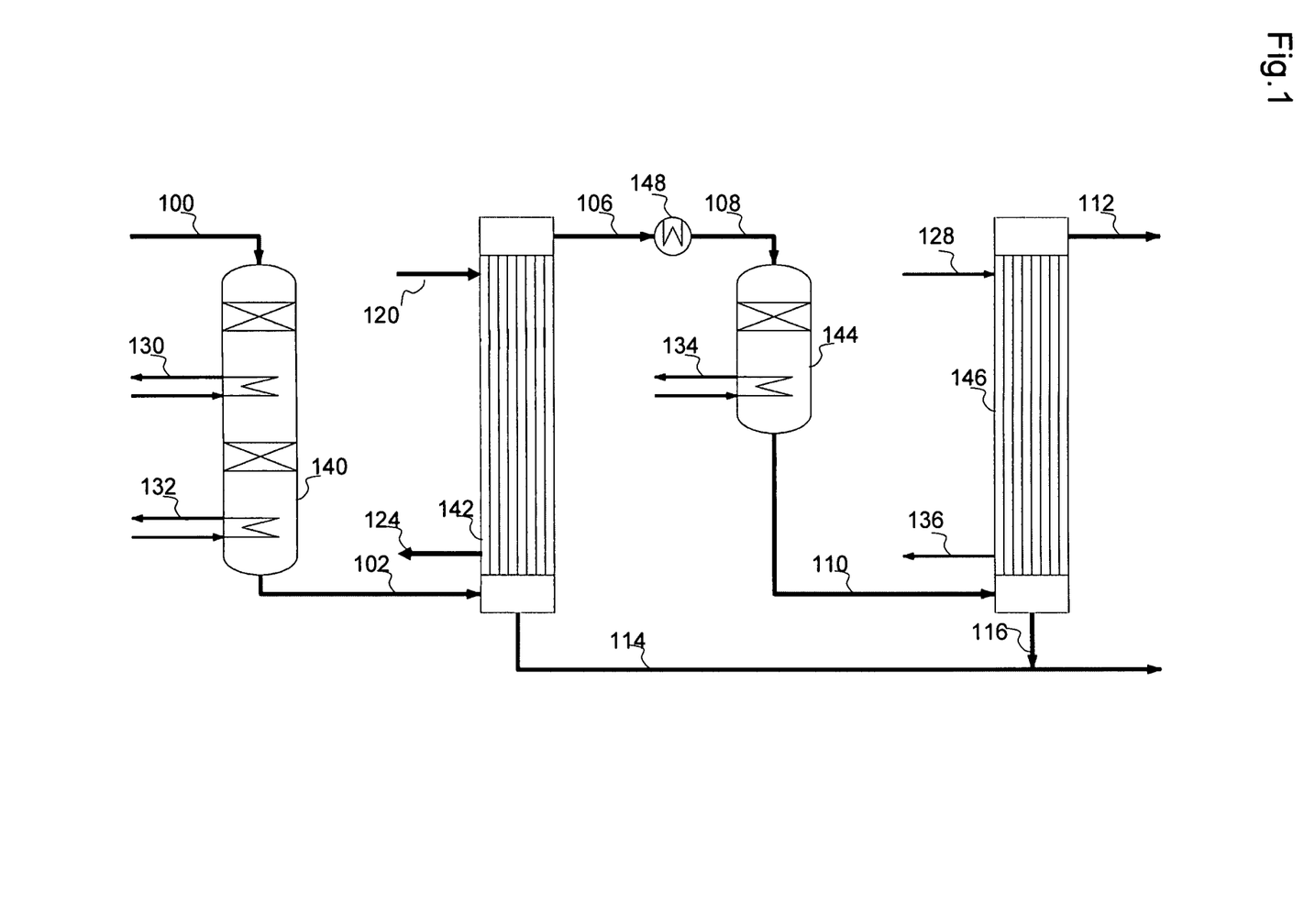
FIG. 1 shows a process layout according to the prior art for $H_2SO_4$ production from a process gas containing $SO_2$.

A process according to the prior art for $SO_2$ oxidation and subsequent condensation of concentrated sulphuric acid, employing 2 condensation steps is shown in FIG. 1. The principal steps of the process includes $SO_2$ oxidation in the presence of a first catalyst in a first catalytic reactor 140, condensation of the produced $SO_3$ as sulphuric acid in an intermediate condenser 142, oxidation of remaining $SO_2$ in a second catalytic reactor 144, and further condensation of remaining and produced $SO_3$ in a final condenser 146, before a substantially clean process gas may be sent to the atmosphere.

In the process, temperature control is critical, a.o. because a minimum temperature is required for the exothermal catalytic oxidation of $SO_2$ to $SO_3$ in 140 and 142 while a high temperature limits the equilibrium between $SO_2$ and $SO_3$, such that a portion of $SO_2$ will not be oxidized at higher temperatures. Further $H_2SO_4$, readily formed from $H_2O$ and $SO_3$ in liquid state is very corrosive, while in gas state it is not, so it is desired to keep $H_2SO_4$ containing process gases above the dew point, until condensation, which by its nature requires temperatures below the dew point, and therefore requires corrosion resistant materials such as glass tubes. Specifically the process is designed for inlet temperature to catalyst beds to be in the range 370-500° C. and for inlet temperatures to the condenser 142 to be 5-100° C., preferable, 10-70° C., or even more preferably 20-50° C. such as about 30° C. above the sulfuric acid dew point.

In the specific embodiment of the process a process gas 100 is directed to a first catalytic reactor 140 in which the majority of $SO_2$ oxidation takes place. This first catalytic reactor may be designed with one catalytic bed or multiple catalytic beds if the amount of sulfur dioxide is so high that it is desirable to withdraw reaction heat e.g. in heat exchangers 130 and 132, to provide reaction at a reduced temperature, such that the inlet process gas 102 to the first condenser 142 is not limited by the equilibrium between $SO_2$ and $SO_3$.

In the intermediate condenser 142 the concentration of $SO_3$ at the outlet 106 may be high enough for corrosion to occur, if $SO_3$ condenses as $H_2SO_4$.

The intermediate condenser 142 is configured for cooling the process gas 102 which enters the condenser with a typical temperature of 290° C. Typically cooling is made by heat exchange with a heat transfer medium such as air 120, which is at a lower temperature than the process gas. The condenser 142 must be configured to be compatible with the process gas and the condensate, which for a corrosive condensable component may involve being corrosion resistant, e.g. made from glass tubes or other corrosion resistant materials such as ceramic tubes or lined with protective coatings.

Typically the cooling zone 150 will be a heat exchanger in which a heat transfer medium such as air, flows countercurrent to the process gas. The benefit of counter current flow is that in the flow direction of the process gas the temperature will decrease and accordingly the potential for condensation will increase. Thereby the highest level of condensation is obtained.

Typically the condenser will be mounted vertically with process gas inlet 102 at the bottom, and collection of condensed liquid at the bottom 114, but in cases where the process gas flow is very high it may be preferred to have the flow of condensed liquid and gas to be co-current, to avoid flooding.

According to the prior art the condenser is operated such that in all positions of the condenser the conditions were at or close to the dew point of the condensable component. This is a natural consequence of counter-current operation, since the temperature in all positions of the condenser (except possibly shortly after the inlet) will be at condensing conditions, and further downstream, the temperature will always be lower.

Figure 2:
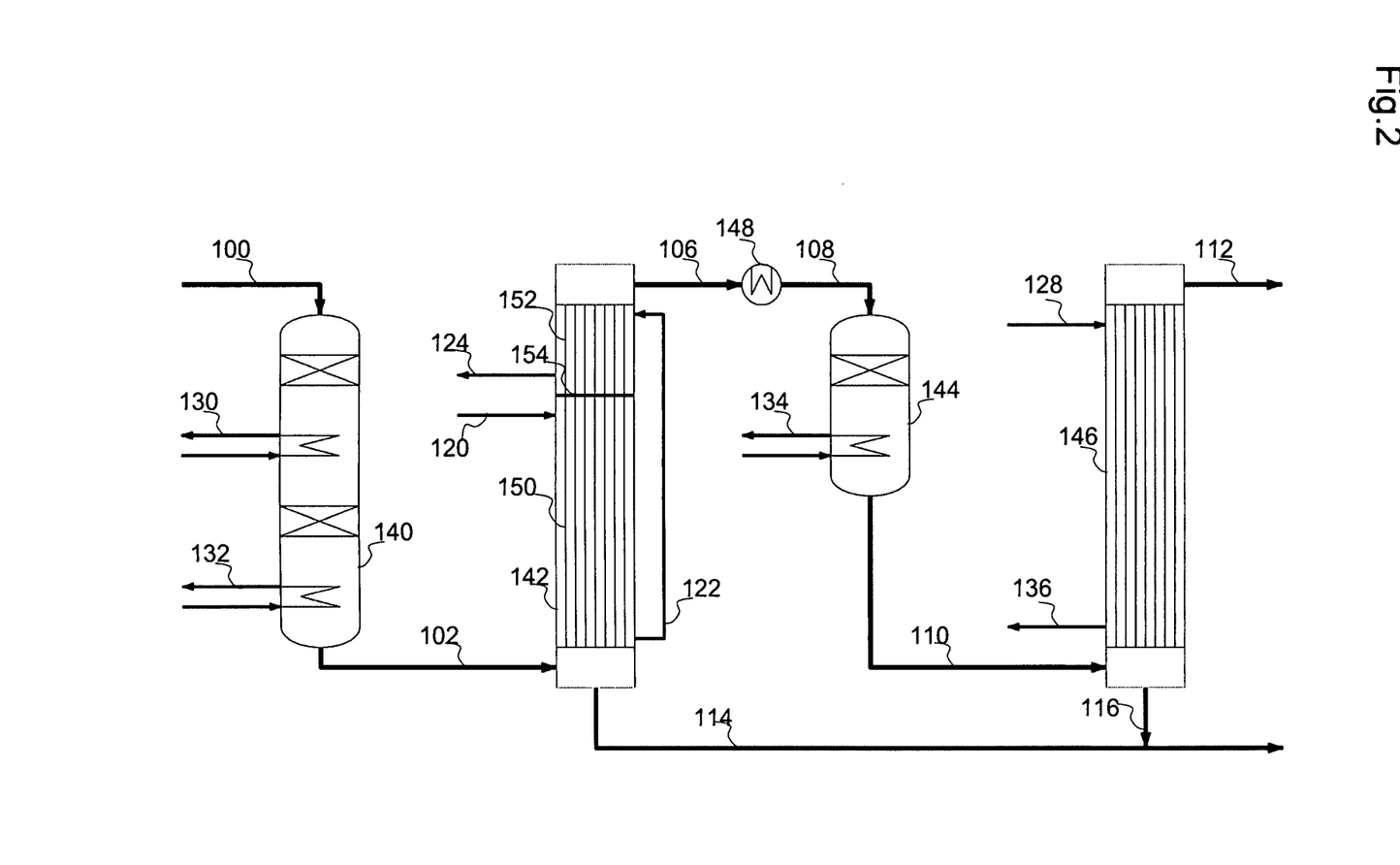
FIG. 2 shows a process layout according to an embodiment of the present disclosure for $H_2SO_4$ production from a process gas containing $SO_2$, employing a condenser according to the present disclosure.

Now, as illustrated in FIG. 2 an alternative to the prior art has been developed, involving a condenser 142 according to the present disclosure, in which the process gas cooling zone 150 is followed by a process gas re-heating zone 152, in which the process gas is heated. To ensure successful re-heating the heat transfer medium of the cooling zone must be separated from the re-heating zone. One way to do this is to block the flow of the heat transfer medium from the cooling zone to the re-heating zone. Secondly a source of heat must be provided for the heating zone. A possible way of providing heat to the re-heating zone 152 is to transfer the heated heat transfer medium in a line 122 from the upstream section of the condenser to the heat transfer medium side of the process gas re-heating zone 152 at the downstream end of the condenser, and thus heating the process gas on the process gas side in in a flow configuration such as, cross-flow, a co-flow or counter current flow with respect to the process gas.

In specific embodiments of the disclosure, for the process for $H_2SO_4/SO_3$ condensation, the process gas side and the heat transfer medium side may be separated by one side flowing in glass tubes, to provide corrosion resistance.

In one embodiment the flow of the heat transfer medium may be inside glass tubes, with sulfuric acid condensing on the outside of the tubes. In this configuration the flow of the heat transfer medium is defined by the connection of the tubes, and it is therefore simple to control which section of the condenser retrieves the heated heat transfer medium. In this configuration the heating tubes are preferably positioned horizontally, such that they have optimal heat exchange efficiency, by generating maximum turbulent flow. The condenser walls must in this configuration be made from highly corrosion resistant materials.

In an alternative embodiment the flow inside the glass tubes is process gas containing condensable $H_2SO_4$, such that condensation takes place inside the tubes, and condensate may be collected in a bottom zone of the condenser, which may be at level or below the gas inlet—i.e. proximate to an end of the condenser. In this case a flow restricting element 154 on the heat transfer medium side is beneficial, to ensure that the cold heat transfer medium for cooling the process gas in the cooling section 150 is kept from entering the heat transfer medium side of the process gas re-heating zone 152. It must be realized that when the heated heat transfer medium is directed to the reheating zone gas the pressure on the cold side of flow restricting element 154 may typically be higher than on the warm side, and therefore the flow restricting element 154 may have to be designed to be substantially flow tight for the heat transfer medium, e.g. by provision of gaskets of corrosion resistant material such as fluoropolymers including PTFE or PFA, even though absolute tightness is not required.

Alternatively other heat sources than the heated heat transfer medium may be used as heat sources for the reheating zone 152, primarily other warm process gases, but any other means of heating may be used, such as electrical heating.

For a condenser in which the process gas flows inside glass tubes, the flow restricting element 154 on the heat exchange medium side may be made as a partition tube sheet, in which holes matching the tubes are positioned. Specifically the partition tube sheet may be made from a steel plate or from a wafer construction based on a steel plate with stabilizers. Where the condensable component is corrosive, the plate may either be made from corrosion resistant steel or another corrosion resistant material, or it may be made be surface protected by an appropriate material, such as fluoropolymers, including PTFE or PFA.

In the prior art for the specific process for $SO_3$ condensation, the condenser is typically made from tubes made from a corrosion resistant material, such as glass. The tubes are typically round. Inside the tubes, a turbulence enhancing element such as a spiral is often mounted to aid heat transfer and condensation, and a plug of material is provided to assist condensation of condensable liquid.

Figure 3:
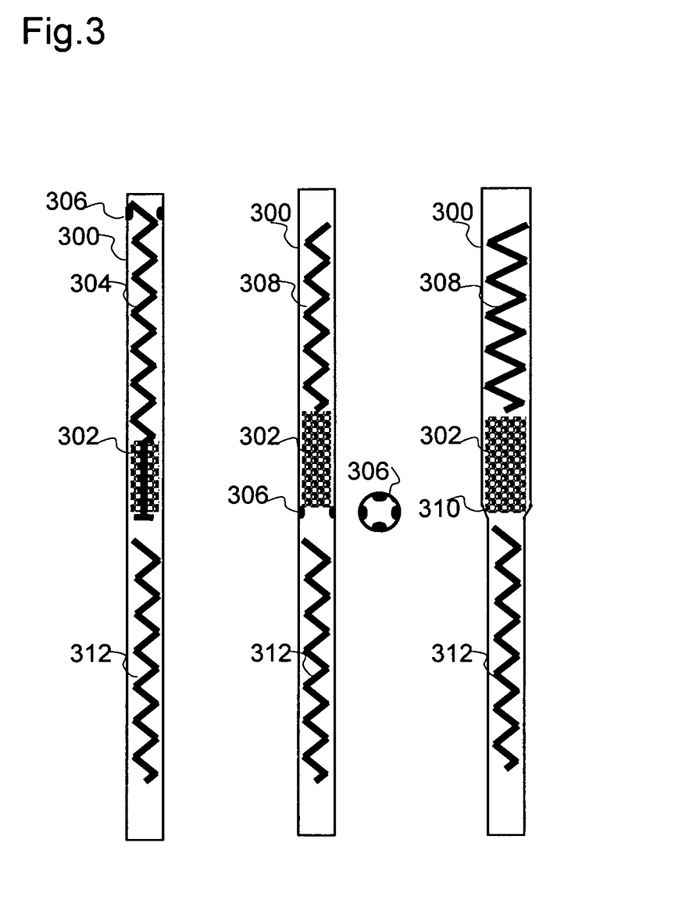
FIG. 3 shows condenser tubes used in some embodiments of the present disclosure.

According to the disclosure, for the specific process for $H_2SO_4/SO_3$ condensation, the condensers process gas side is made from a corrosion resistant material, typically glass tubes, but tubes or other geometries made from ceramics, or coated materials may also be used. The tubes may typically be round, but they may have any suitable shape. As illustrated in FIG. 3 the tubes 300 may be configured for having a turbulence enhancing element such as a spiral 306 mounted to aid heat transfer by formation of turbulent flow, with minimal pressure loss. Additionally the tubes may further be configured for having a droplet coalescing element 302 such as a demister, i.e. a plug of material provided to assist droplet formation, and thus condensation of the condensable liquid. By introduction of a heating zone in the condenser the tubes preferably are configured for having a droplet coalescing element positioned proximate to the downstream end of the cooling section, and the tubes may further be configured for having a second turbulence enhancing element 304, 308 positioned in the heating section.

When using the disclosed condenser in a process for condensation in which the process gas flows inside glass tubes 300, it may beneficially be configured for including process supporting elements such as turbulence enhancing elements inside the tubes, such as spirals 304, 306, 308, as well as droplet coalescing elements 302. These process supporting elements are not essential for the operation of the disclosure, but their presence may contribute to the efficiency of the disclosure. Furthermore the specific configuration of the condenser may involve elements for keeping these process supporting elements in the correct position.

Such condensation process enhancing elements may also be used with benefit in other condensation processes.

In the case of condensation of corroding condensable liquids such as sulfuric acid, the process supporting elements may with benefit be made from highly corrosion resistant materials, such as fluoropolymers, including PTFE or PFA.

Proximate to the outlet of the condensing zone of the condenser tubes a droplet coalescing element 302 may be positioned. While on one hand it is important that the pressure loss over the droplet coalescing element is low, it is also important that the droplet coalescing element is able to collect a significant portion of mist and droplets of the condensable component, prior to the heating zone, to ensure that the condensed liquid is not reheated and evaporated, but is collected as droplets of condensate.

Figure 4:
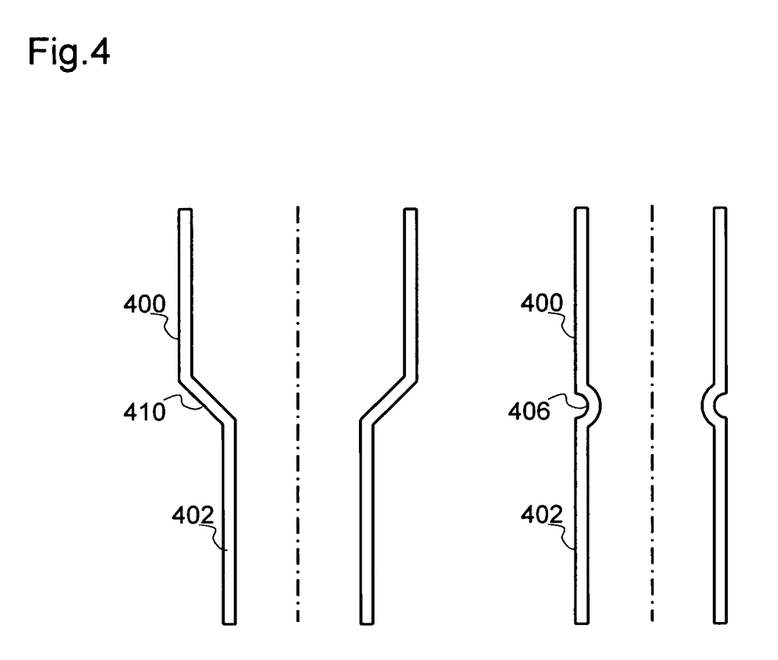
FIG. 4 shows tubes comprising securing elements used in some embodiments of the present disclosure.

The positioning of the turbulence enhancing element may be ensured by securing elements in the tube. These securing elements may involve one or more partial or full limitations of the inner diameter of the glass tube, including individual indentations 406 of the glass tube, as shown in FIG. 4, or a shoulder 410 formed by a reduction of the diameter of the glass tube. The securing elements may be positioned at an upstream or a downstream end of the turbulence enhancing elements 304, 306, 312, such that the position of the turbulence enhancing element is secured by the turbulence enhancing element resting on the securing element or by hanging from the securing element.

Figure 5:
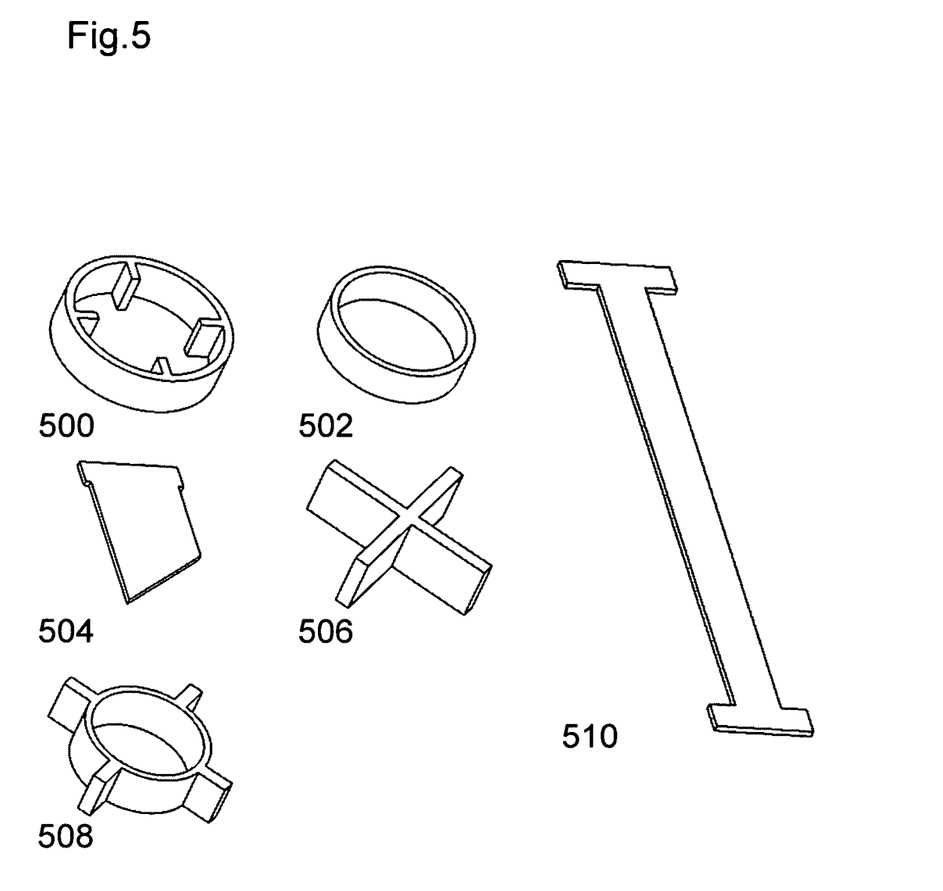
FIG. 5 shows examples of restriction elements used in some embodiments of the present disclosure.

It may also be beneficial to restrict the movements of the droplet coalescing 302 element such that the condensing process gas does not shift the position of the droplet coalescing element. As illustrated in FIG. 3 and FIG. 4 this may be obtained by one or more indentations of the tube 306, 310, 406, 410, including the formation of a shoulder 310, 410. In addition the condenser may be configured for the droplet coalescing element 302 to rest on an additional restriction element 306, which contacts the one or more indentations of the tube, and which supports the droplet coalescing element, or as illustrated in FIG. 3 A, where the turbulence enhancing element 304 secures the position of the droplet coalescing element 302. In FIG. 5 specific examples of such additional restriction elements are shown, including rings configured for resting on one or more indentations such as 500 and 502 or in the case of a shoulder constriction of the tube, restriction elements having only few contact points with the tube wall, such as a plate configured for resting on a tube constriction 504, a cross shaped element 506, a ring with protrusions 508 or a elongated element, around which the droplet coalescing element may be positioned 510. Common for all these elements is that they restrict the free movement of the droplet coalescing element, such that the position of the droplet coalescing element is well defined, and the condensation is complete before droplets enter the reheating zone.

A further beneficial use of the disclosed condenser, involves its use in as the final condenser prior to the stack. In the prior art, it has been common practice to add hot diluent air in this position, to avoid $H_2SO_4$ condensation, but reuse of the thermal energy in the heat transfer medium in a condenser according to the present disclosure is a more efficient to avoid these problems.

EXAMPLES

Example 1

A first exemplary embodiment according to the prior art involves processing a $H_2S$ containing offgas is processed in a WSA sulphuric acid plant. The process consists of 3 steps:

A) Combustion, $H_2S$ is oxidised to $SO_2$

B) $SO_2$ conversion, $SO_2$ is reacted with $O_2$ and converted to $SO_3$

C) Condensation, $SO_3$ is hydrated to $H_2SO_4$ (g) and condensed to $H_2SO_4$ (l)

The process is operated under the process conditions shown in Table 1, according to FIG. 1, such that the process gas outlet temperature from the condenser is below the sulphuric acid dew point requiring corrosion resistant materials downstream the condenser.

TABLE 1

| | Process Gas IN 102 | OUT 106 | Cooling Air IN 120 | OUT 124 | Sulphuric Acid OUT 114 |
|---|---|---|---|---|---|
| Flow (Nm³/h) | 15400 | 13900 | 35600 | 35600 | 958 |
| Temperature (° C.) | 290 | 110 | 54 | 233 | 263 |
| $T_{dew}$(° C.) | 263 | 128 | | | |
| Pressure (mbarg) | 71 | 54 | | | |
| $H_2SO_4$ %(v/v): | 2.49 | 10 ppmv | | | 90 |
| $SO_3$ %(v/v): | 3.13 | 0.00 | | | |
| $H_2O$ %(v/v): | 8.68 | 5.44 | | | 10 |
| Inerts: | balance | balance | | | |

The process gas is leaving the condenser at 110° C. which is about 18° C. below the sulphuric acid dew point. It therefore contains liquid droplets of sulphuric acid which makes it very corrosive.

Example 2

A second exemplary embodiment according to the present disclosure is shown in FIG. 2, and Table 2. Here the conditions correspond to those of Example 1, with the exception being that the condenser is operated according to the present disclosure, e.g. with a reheating zone, such that the process gas outlet temperature from the condenser is above the sulphuric acid dew point such that it is not necessary to use corrosion resistant materials downstream the condenser.

TABLE 2

| | Process Gas IN 102 | OUT 106 | Cooling Air IN 120 | OUT 124 | Sulphuric Acid OUT 114 |
|---|---|---|---|---|---|
| Flow (Nm³/h) | 15400 | 13900 | 35600 | 35600 | 958 |
| Temperature (° C.) | 290 | 180 | 54 | 204 | 263 |
| $T_{dew}$(° C.) | 263 | 128 | | | |
| Pressure (mbarg) | 71 | 43 | | | |
| $H_2SO_4$ %(v/v): | 2.49 | 10 ppmv | | | 90 |
| $SO_3$ %(v/v): | 3.13 | 0.00 | | | |
| $H_2O$ %(v/v): | 8.68 | 5.44 | | | 10 |
| Inerts: | balance | balance | | | |

The process gas in this example is leaving the condenser at 180° C. which is approximately 50° C. above the sulphuric acid dewpoint. The gas is therefore dry and no longer corrosive.

The invention claimed is:

1. A sulphuric acid condenser, having a process gas side and a heat transfer medium side
    said condenser being configured for feeding a hot process gas containing sulfuric acid to an inlet of the condensing side,
    and being further configured for withdrawing a cooled process gas from an outlet of the condensing side,
    and being even further configured for withdrawing a sulfuric acid or oleum condensate in a position proximate to one end of the condenser,
    and said condenser having the process gas side divided in
    a process gas cooling zone configured for having a cool heat transfer medium inlet and a heated heat transfer medium outlet,
    and a process gas re-heating zone downstream the process gas cooling section, configured for re-heating of the process gas.

2. A condenser according to claim 1, in which the condenser is configured for the process gas side of the process gas re-heating zone to receive thermal energy from the heated heat transfer medium.

3. A condenser according to claim 2, configured for the heat transfer medium and the process gas in the reheating zone to flow counter-current.

4. A condenser according to claim 2, configured for the heat transfer medium and the process gas in the reheating zone to operate in cross-flow.

5. A condenser according to claim 1, in which the condenser is configured for the process gas side to be separated from the heat exchange medium side by glass.

6. A condenser according to claim 5 above, comprising one or more glass tubes configured for having a flow of process gas on the inside of the glass tubes and a flow of heat transfer medium on the outer side of the glass tubes.

7. A condenser according to claim 6 above, comprising one or more glass tubes configured for having a flow of heat transfer medium on the inside of the glass tubes and a flow of process gas on the outer side of the glass tubes.

8. A condenser according to claim 1, further comprising a flow restricting element separating the flow of heat transfer medium on the heat transfer medium side of the condensing zone and the re-heating zone.

9. A process for the condensation of sulphuric acid and/or oleum in a process gas comprising the steps of:
  (i) passing the process gas to a sulphuric acid condensing stage according to claim 1 in which the inlet temperature is above the dew point of sulphuric acid,
  (ii) cooling the process gas to below the dew point of sulphuric acid,
  (iii) condensing and withdrawing sulphuric acid, and
  (iv) reheating the process gas to above the sulphuric acid dew point within the condenser stage.

10. A process according to 9, in which the temperature of the process gas at the outlet from the condenser stage after reheating in step (iv) is at least 10° C. above the dew point of sulphuric acid.

11. A process for the production of sulphuric acid and/or oleum in a process gas comprising the steps of:
  (a) providing a feed process gas containing 0.1-30 mol % of $SO_2$;
  (b) passing the feed process gas through a first $SO_2$-conversion step in which $SO_2$ is oxidized to $SO_3$ in one or more catalyst beds;
  (c) cooling the $SO_3$-containing process gas from said first $SO_2$-conversion step to a temperature 0-100° C. above the sulphuric acid dew point of the process gas; and
  (d) condensing sulphuric acid in the process gas in a first condensation stage,
  in which at the condenser stage is operated according to claim 9.

12. A process for the production of sulphuric acid and/or oleum in a process gas according to claim 11, further comprising the steps
  (e) further reheating the resulting process gas stream from step
  (f) and passing this process gas to a second $SO_2$-conversion step in which remaining $SO_2$ is oxidized into $SO_3$ in one or more catalyst beds,
  (g) cooling the process gas to a temperature 0-100° C. above its sulphuric acid dew point and
  (h) subsequently passing the process gas to a final condensing stage in which at least one of the condenser stages (d) and (h) are operated according to claim 10.

13. A process according to claim 11, in which the oxidant is added in the form of $O_2$ rich gas.

* * * * *